United States Patent [19]
Nagami

[11] Patent Number: 5,668,415
[45] Date of Patent: Sep. 16, 1997

[54] ARRANGEMENT OF HARNESSES IN A VEHICLE

[75] Inventor: Masafumi Nagami, Omiya, Japan

[73] Assignee: Kansei Corporation, Omiya, Japan

[21] Appl. No.: 503,085

[22] Filed: Jul. 17, 1995

[30] Foreign Application Priority Data

Jul. 18, 1994 [JP] Japan .................. 6-165340

[51] Int. Cl.⁶ .................................................. H02B 1/20
[52] U.S. Cl. .................. 307/9.1; 174/72 A; 361/624; 439/34
[58] Field of Search .......................... 307/9.1, 10.1, 307/147; 439/76.1, 34, 502, 505, 506, 638, 639, 155; 364/424.05, 423.098; 174/71 R, 72 R, 72 A, 52.1; 361/641, 647, 600, 601, 622, 624, 628, 643, 644, 784, 775, 785

[56] References Cited

U.S. PATENT DOCUMENTS

| | | |
|---|---|---|
| 3,568,131 | 3/1971 | Kennedy .................. 439/155 |
| 4,386,278 | 5/1983 | Kawada et al. .................. 307/9.1 |
| 4,974,121 | 11/1990 | Masuko et al. .................. 439/76.1 |
| 5,237,826 | 8/1993 | Baldwin et al. .................. 174/72 A |
| 5,501,605 | 3/1996 | Ozaki et al. .................. 174/72 A |

*Primary Examiner*—Richard T. Elms
*Attorney, Agent, or Firm*—Jacobson, Price, Holman & Stern, PLLC

[57] ABSTRACT

In an arrangement of harnesses in a vehicle, a plurality of harnesses connected to a plurality of control units and electronic parts are bundled and disposed in each section of the vehicle so that a bundle of harnesses (25) in one (20) of the sections are connected to a bundle of harnesses in another section (30) via a multiple connector (70). The harnesses bundle (25) in the section (20) is separated into at least two harness bundles (25A, 25B). One (25A) of the two harness bundles is directly connected to a connector (31a) of a control unit (31) in the different section (30). The other harness bundle (25B) is connected to a harness bundle (35C) in the different section (30) via the multiple connector (70).

6 Claims, 8 Drawing Sheets

ARRANGEMENT OF HARNESSES IN A VEHICLE

BACKGROUND OF THE INVENTION

1. Field of the Invention

This invention relates to an arrangement of harnesses in a vehicle, in which a bundle of harnesses disposed in a section of the vehicle are connected to a bundle of harnesses disposed in another section thereof by means of a multiple connector.

2. Description of the Prior Art

As shown in FIG. 8, let it be supposed that a vehicle is divided into, for example, first, second, and third sections. In the first section A, a battery 1, a key switch 2, a combination switch 3, and other electronic parts are disposed. Those are each connected to a plurality of harnesses 4a and a harness bundle 4b. The harnesses 4a and the harness bundle 4b make up an engine harness bundle 5 in the first section A.

Likewise, in the second section B, a rear window defogger switch (DEF switch) 6, a time control unit 7, a buzzer 8, a rear window defogger relay (DEF relay) 9, and other electronic parts are disposed. These are each connected to a plurality of harnesses 10a and a harness bundle 10b. The harnesses 10a and the harness bundle 10b make up a main harness bundle 11 in the second section B.

In the third section C, a door switch 12, a rear window defogger heater (DEF heater) 13, and other electronic parts are disposed. These are each connected to a plurality of harnesses 14a and a harness bundle 14b. The harnesses 14a and the harness bundle 14b make up a body harness bundle 15 in the third section C.

The engine harness bundle 5 and the main harness bundle 11 are connected to each other by means of a multiple connector 16. A part of the main harness bundle 11 and the body harness bundle 15 are connected to each other by means of a multiple connector 17. Thereby, based on signals from sensors (not shown) and the switches 2, 3, 6, and 12, the time control unit 7 and other control units (not shown) control various operations.

As mentioned above, the vehicle is provided with many electronic parts and many control units by each of which a great number of controls are carried out. Accordingly, the number of harnesses making up harness bundles, such as the engine harness bundle 5 and the main harness bundle 11, attains to a big figure. This leads to a large number of terminals of the multiple connector 16, thus leading to a large number of terminals which are connected to those of the multiple connector 16. As a result, disadvantageously, the multiple connector 16 is made large-sized and entails high cost. In addition, because of the great number of terminals, great force is disadvantageously required to connect a male connector 16a to a female connector 16b of the multiple connector 16.

A solution to the above-mentioned problems is that the multiple connector 16 is separated into a plurality of connectors. However, this is at a disadvantage in that the number of connectors is increased and therefore the number of constituent parts is increased.

SUMMARY OF THE INVENTION

It is therefore an object of the present invention to provide an arrangement of harnesses by which, without increasing the number of connectors, the number of terminals of a multiple connector is reduced so that the connector is made small-sized and, at the same time, the number of harnesses is reduced.

In an arrangement of harnesses according to the present invention, a plurality of harnesses connected to a plurality of control units and electronic parts are bundled and disposed in each section of a vehicle so that a bundle of harnesses in one of the sections are connected to a bundle of harnesses in another section by means of a multiple connector. The harness bundle in each section is separated into at least two harness bundles and then one of the two separated harness bundles in one section is connected to one of the two separated harness bundles in another section by placing a control unit at each connecting part of the harness bundles. The other one of the two separated harness bundles is connected to the other one of the two separated harness bundles in the other section by means of the multiple connector.

DETAILED DESCRIPTION OF THE EMBODIMENT

An embodiment of an arrangement of harnesses according to the present invention will be hereinafter described with reference to the attached drawings.

Figure 1:
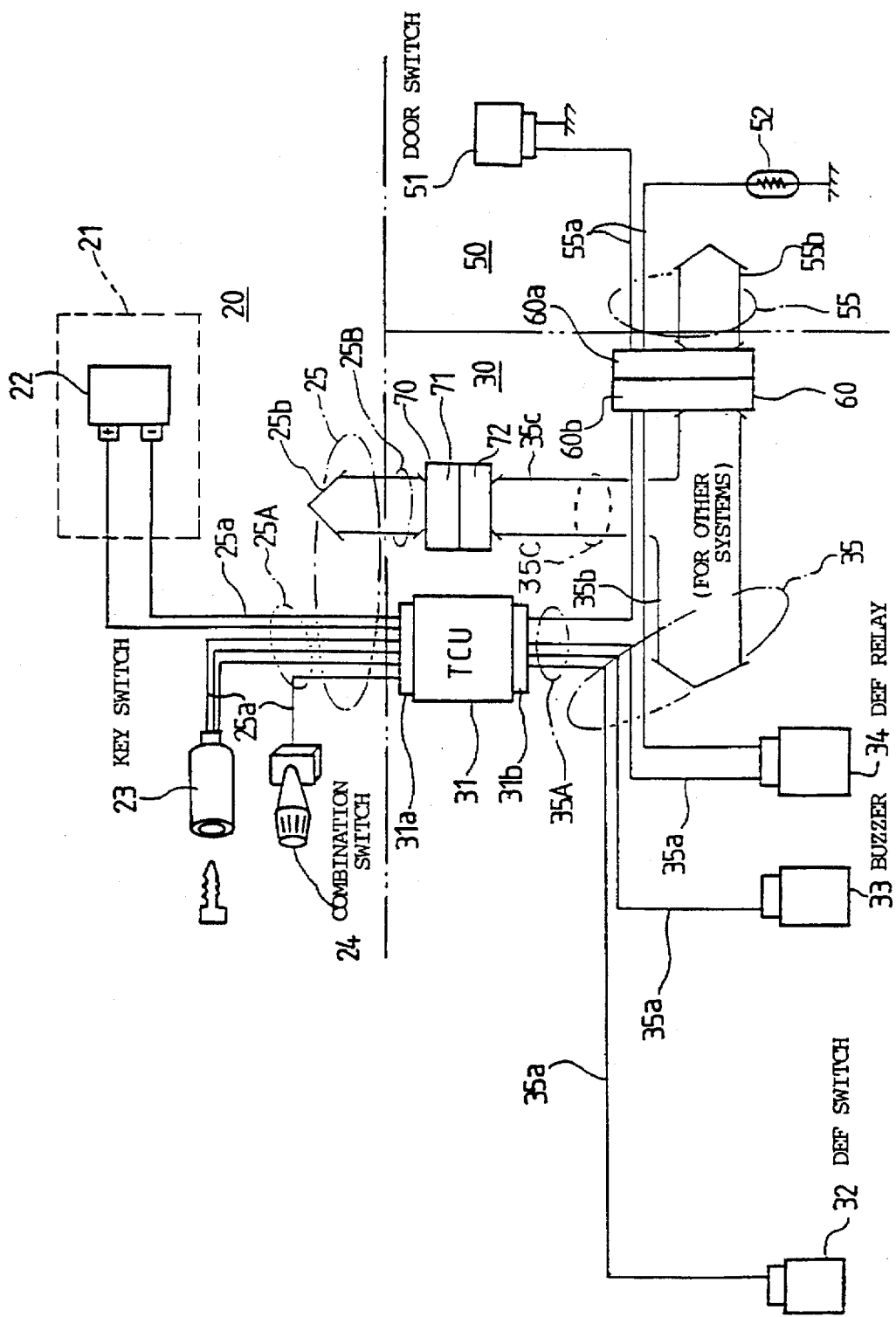
FIG. 1 is a schematic view showing an arrangement of harnesses according to the present invention.

Referring to FIG. 1, reference numerals 20, 30, and 50 designate first, second, and third sections into which a vehicle is divided, respectively. The first section 20 includes a battery 22 mounted in an engine room 21 and electronic parts, such as a key switch 23 and a combination switch 24. In addition, an engine harness bundle 25 is laid in the first section 20. Harnesses 25a, 25a, . . . making up the engine harness bundle 25 are each connected to the battery 22 and the electronic parts 23, 24. Harnesses 25b, 25b, . . . making up the engine harness bundle 25 are each connected to an automatic transmission control unit (not shown) and other electronic parts (not shown). The harnesses 25a, 25a, . . . are bundled into a first harness bundle 25A, while the harnesses 25b, 25b, . . . are bundled into a section harness bundle 25B.

The second section 30 includes a time control unit 31, a rear window defogger switch (DEF switch) 32, a buzzer 33, a rear window defogger relay (DEF relay) 34, a control units (not shown), and electronic parts (not shown). In addition, a main harness bundle 35 is laid in the second section 30. Harnesses 35a, 35a, . . . making up the main harness bundle 35 are each connected to the DEF switch 32, the buzzer 33, and the DEF relay 34. Harnesses 35b, 35b, . . . making up the main harness bundle 35 are each connected to the control units are the electronic parts (not shown). A harness bundle 35A is connected to a female connector 31b of the time control unit 31.

The third section 50 includes a door switch 51, a rear window defogger heater (DEF heater) 52, control units (not shown), and electronic parts (not shown). In addition, a body harness bundle 55 is laid in the third section 50. Harnesses 55a, 55a making up the body harness bundle 55 are each connected to the door switch 51 and the DEF heater 52. Harnesses 55b, 55b, . . . making up the body harness bundle 55 are each connected to a power window control unit (not shown) and electronic parts (not shown). The body harness bundle 55 is connected to a male connector 60a of a multiple connector 60. A female connector 60b of the multiple connector 60 is connected to a part of the mail harness bundle 35. That is, the body harness bundle 55 is electrically connected to the part of the main harness bundle 35.

Figure 2:
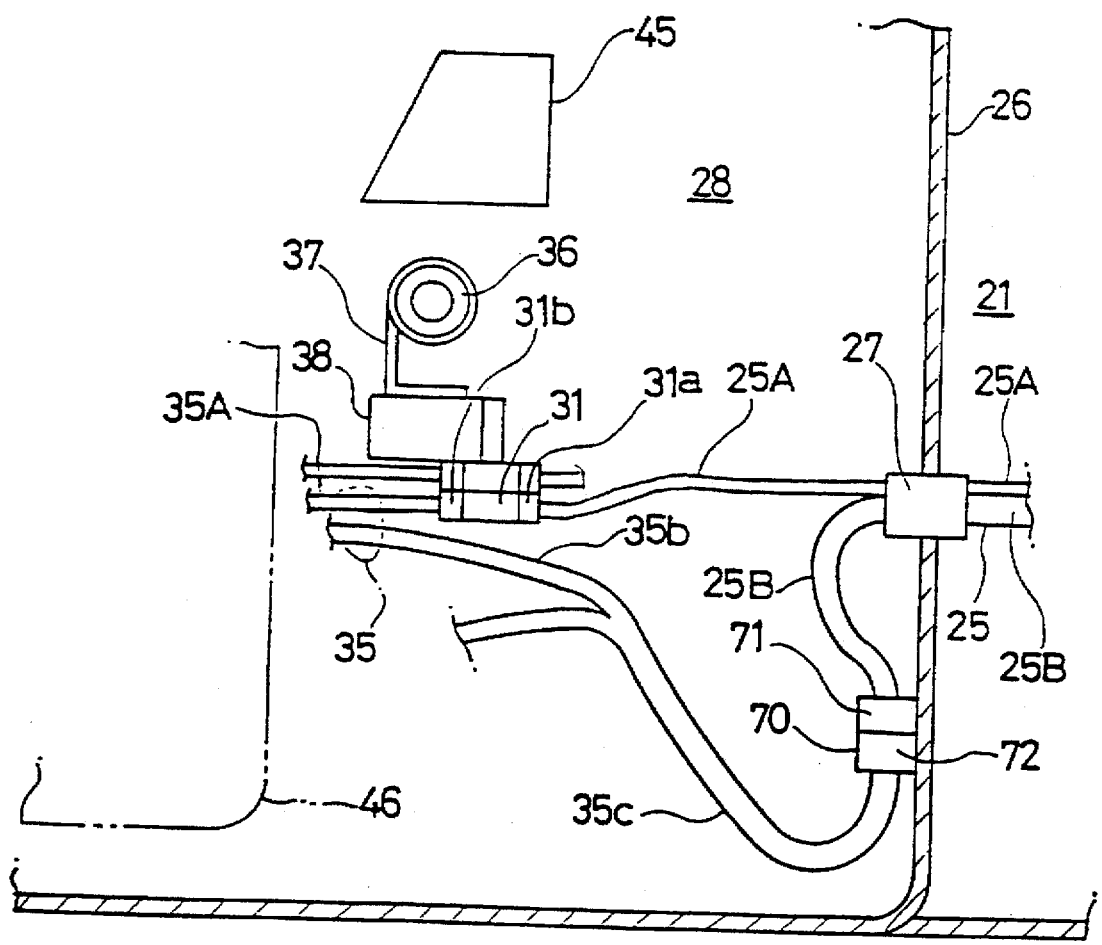
FIG. 2 is a descriptive drawing of the arrangement.

As shown in FIG. 2, the engine harness bundle 25 is led into a passenger's room 28 through a grommet 27 which is fitted in a large hole (not shown) formed in a partition board 26 between the engine room 21 and the passenger's room 28. The harness bundle 25B is connected to a male connector 71 of a multiple connector 70 mounted on the partition board 26. A part of a harness bundle 35C is connected to the female connector 60b of the multiple connector 60. The other part of the harness bundle 35C constitutes a part of the harness bundle 35.

On the other hand, the harness bundle 25A is directly connected to a female connector 31a (unit connector) of the time control unit 31. Reference numerals 45 and 46 designate a meter and a door opening, respectively.

Figure 3:
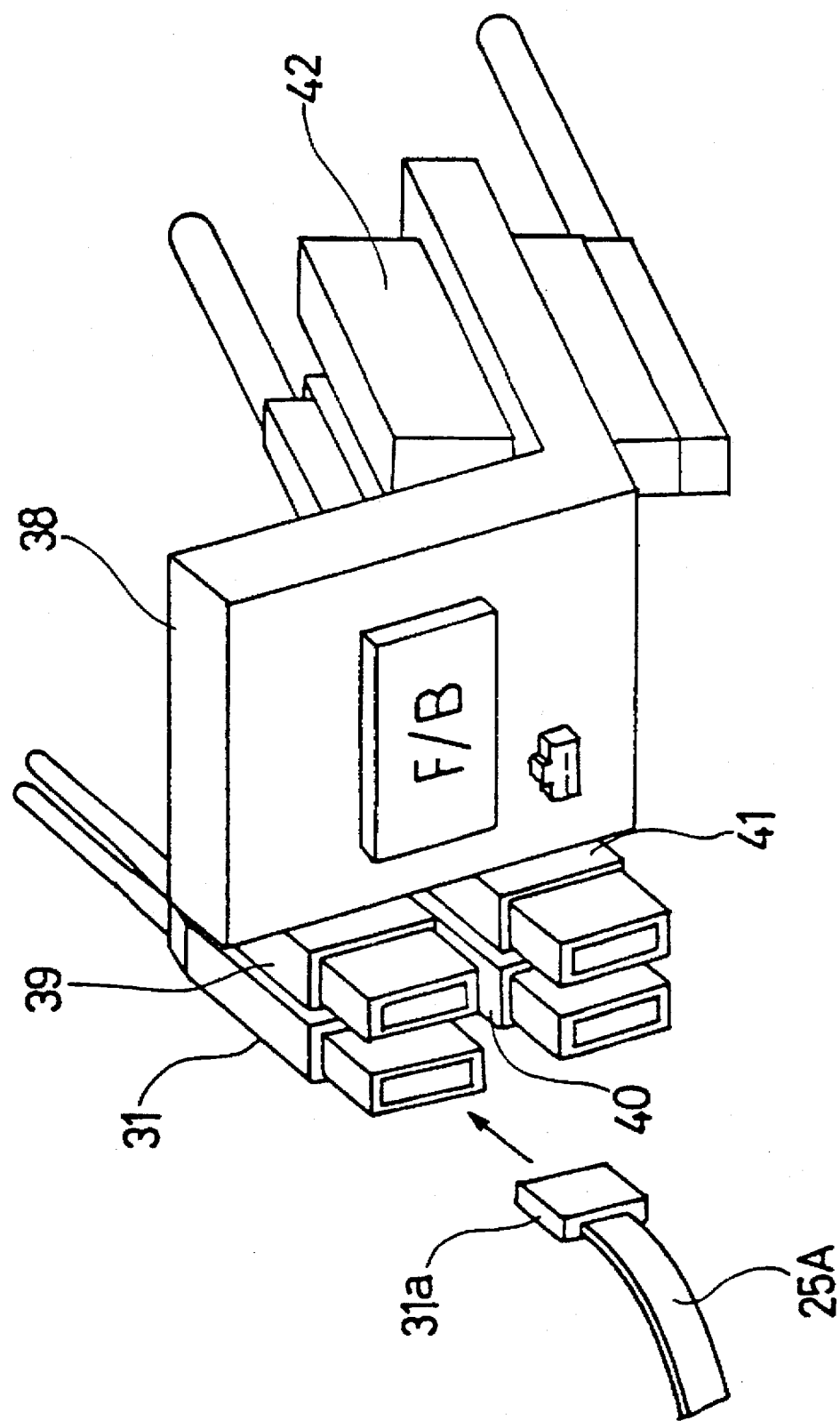
FIG. 3 is a perspective view of a control unit.

The time control unit 31 is fixed to a junction box 38 which is fastened to a steering member 36 by means of a bracket 37. The steering member 36 is mounted on the lower side of an instrument panel (not shown) of the vehicle and extends in right and left directions. The junction box 38 is provided with, as shown in FIG. 3, an antiskid brake system control unit 39, an automatic transmission control unit 40, a shift control unit 41, a wiper control unit 42, and the like. Reference character F/B designates a fuse box.

Figure 4:
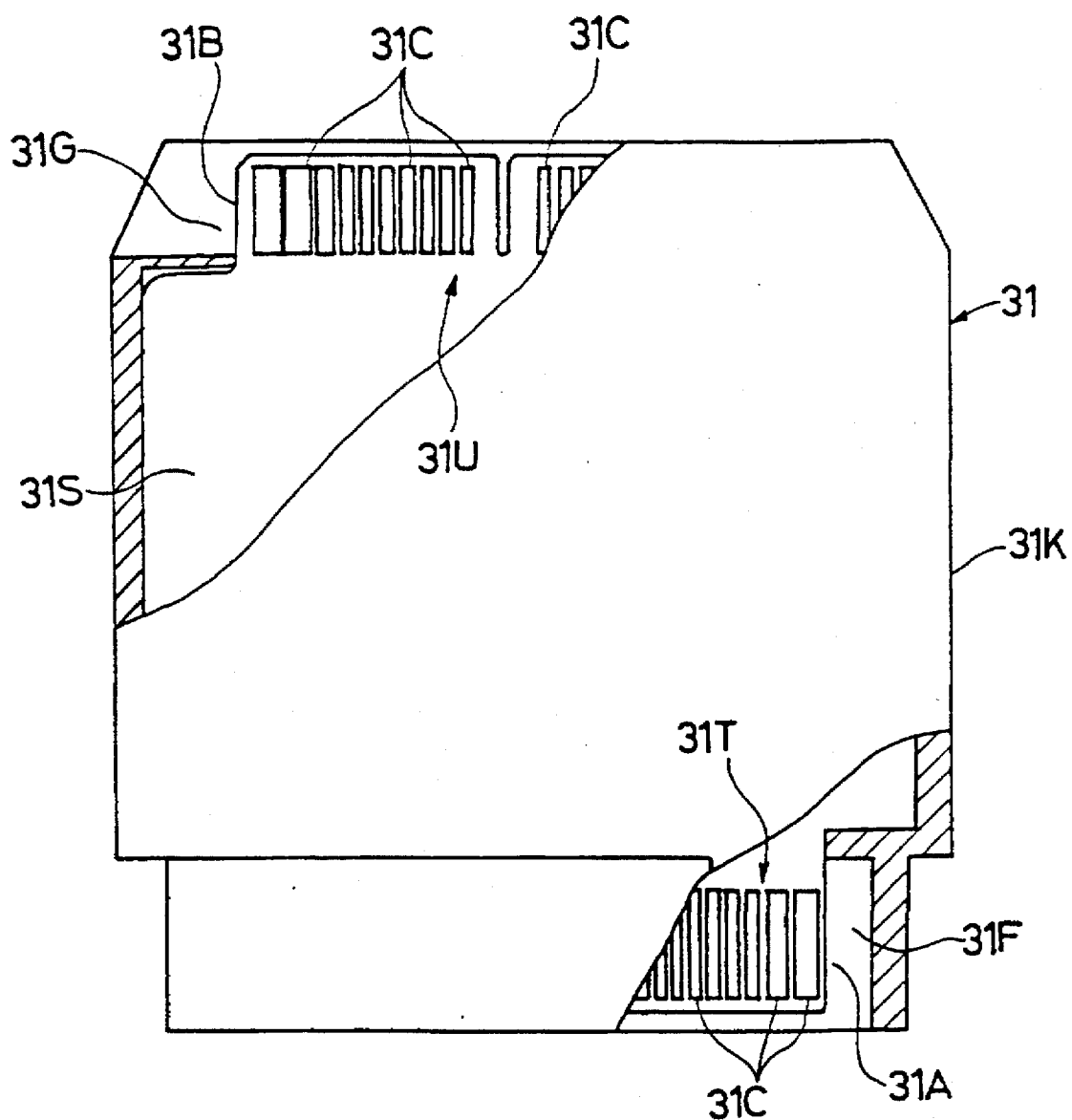
FIG. 4 is a plan view showing a time control unit.

As shown in FIG. 4, the time control unit 31 includes a circuit substrate 31S in a case 31K. Circuit patterns 31C, which serve as male connector terminals (first and second terminals) 31T and 31U, are formed at the edges 31A and 31B of the circuit substrate 31S. The female connectors (terminal connectors) 31a and 31b are connected to the male connector terminals 31T and 31U, respectively. The edges 31A and 31B are situated in openings 31F and 31G formed in the case 31K. On the circuit board 31S, a CPU (not shown) and electronic parts (not shown) are mounted to form a control circuit for performing various controls. The other control units 39 to 42 each have a similar construction to that of the time control unit 31.

Based on signals from the switches 23, 24, 32, etc. through the control circuit, the time control unit 31 judges whether keys have been pulled out from locks or whether lights have been turned out and actuates the buzzer 33. The time control unit 31 also controls an electric current applied to the DEF heater 52 in accordance with the operation of the DEF switch 32.

Figure 5:
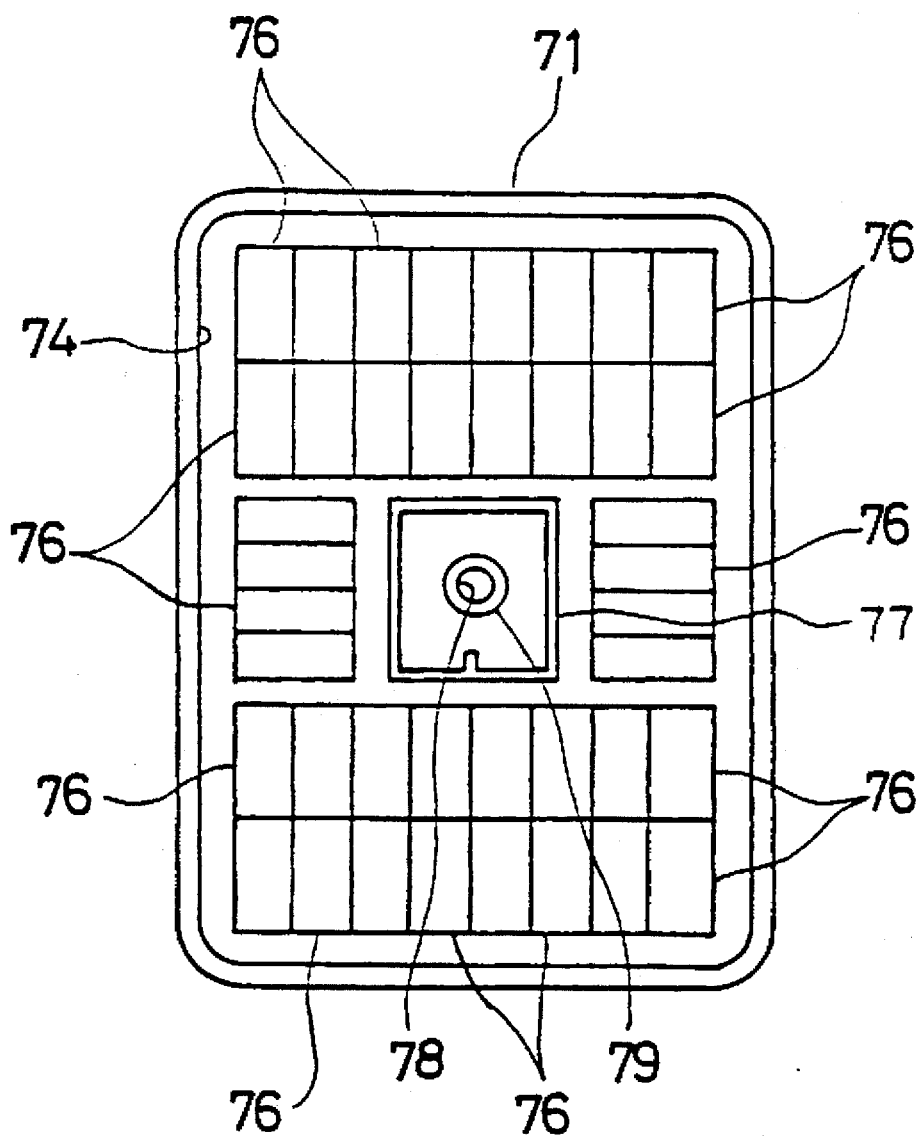
FIG. 5 is a front view showing a male connector of a multiple connector.
Figure 6:
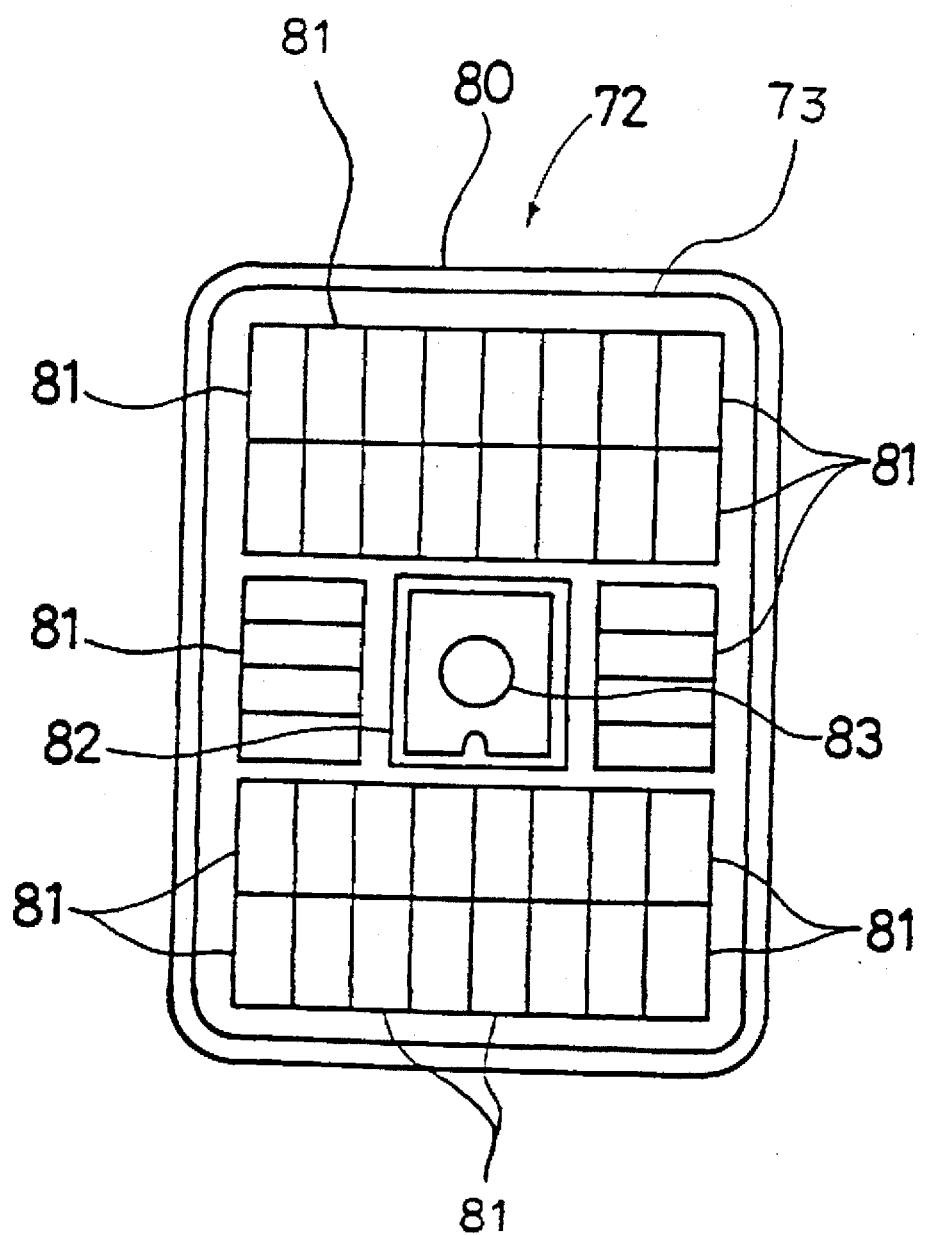
FIG. 6 is a front view showing a female connector of the multiple connector.
Figure 7:
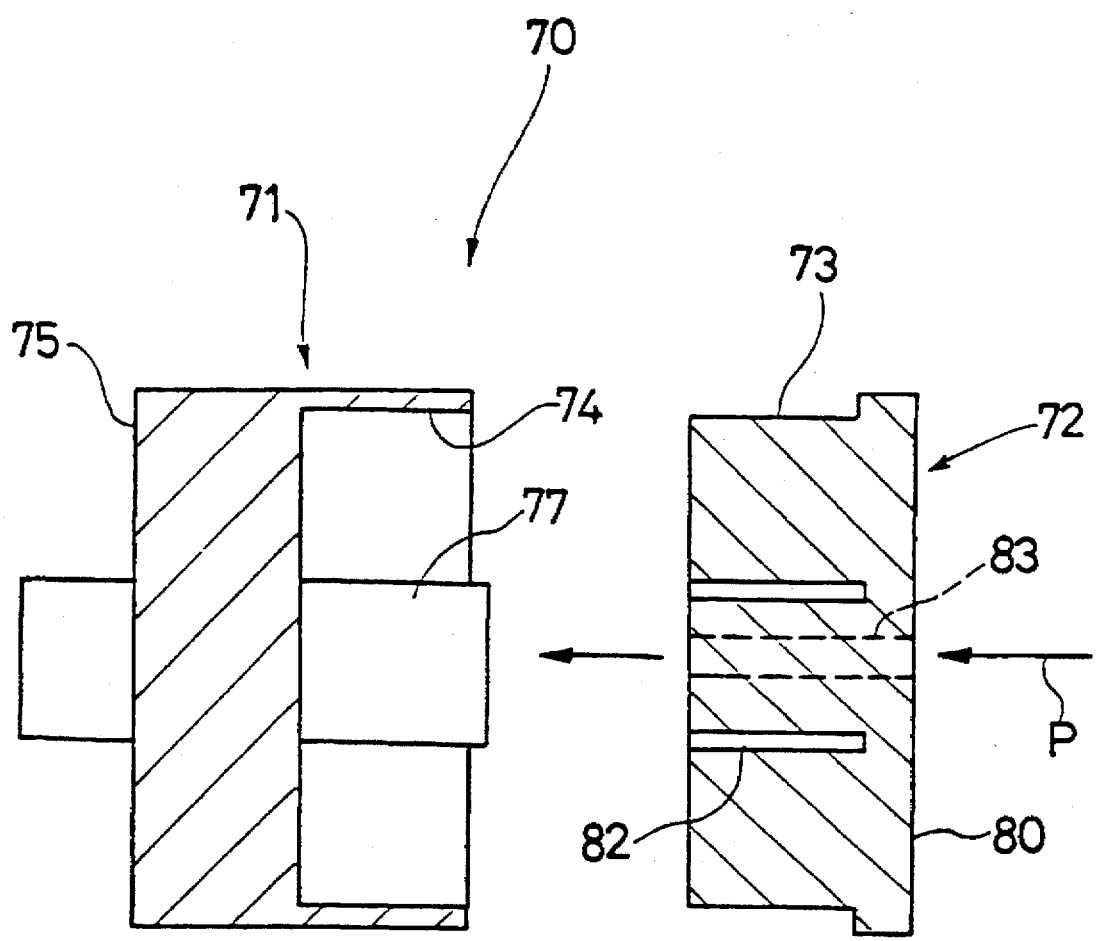
FIG. 7 is a descriptive drawing of a method of connecting the male and female connectors to each other.
Figure 8:
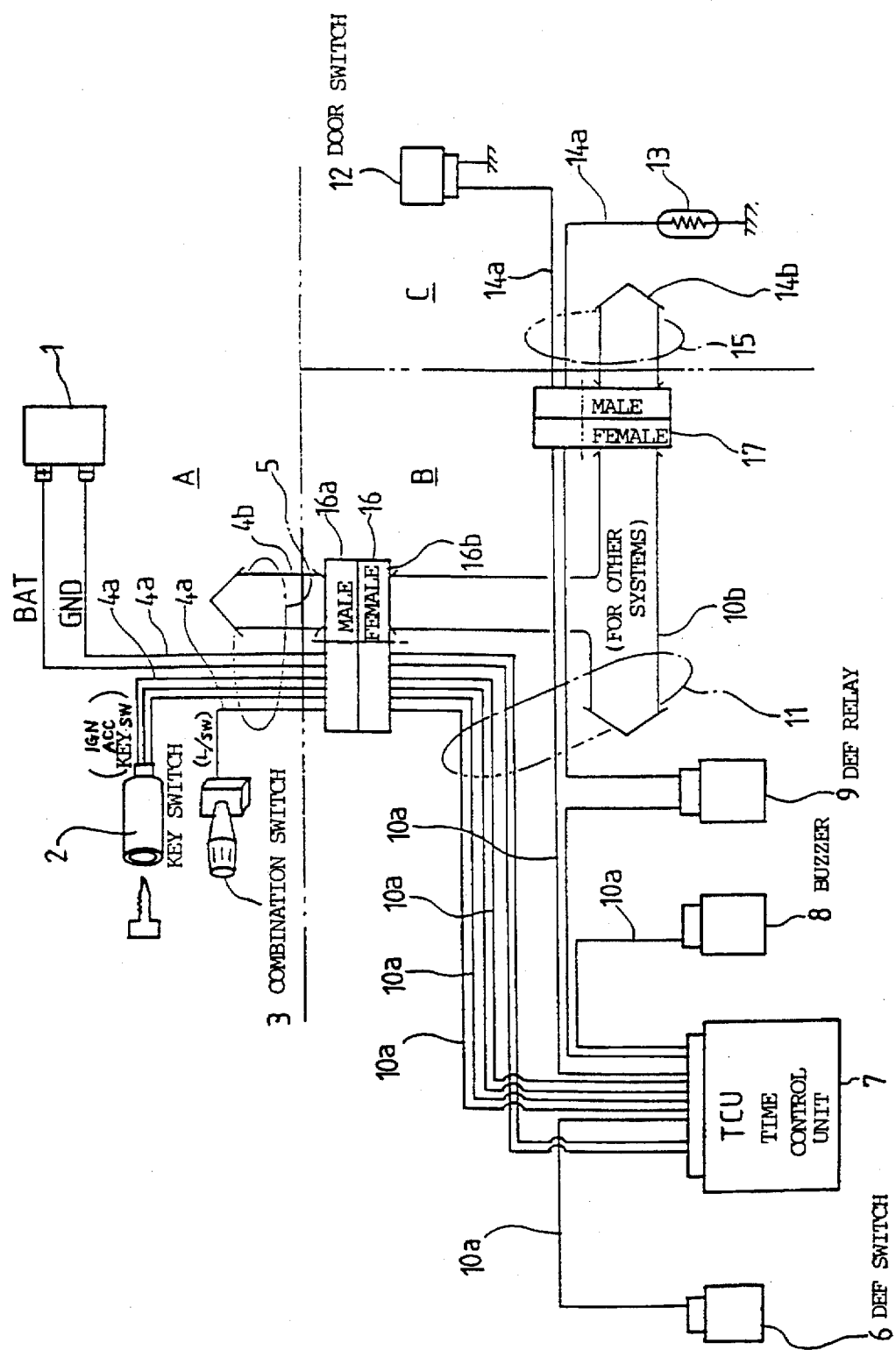
FIG. 8 is a schematic view showing a conventional arrangement of harnesses.

As shown in FIGS. 5 to 7, the multiple connector 70 consists of the male and female connectors 71 and 72. A connector body 75 of the male connector 71 has a concave portion 74 into which a convex portion 73 of the female connector 72 is inserted. A number of terminals holes 76 are formed in the male connector body 75. Male connector terminals (not shown) are united to the terminal holes 76. The male connector terminals are each connected to the harnesses 25b of the harness bundle 25B.

A box-like projection 77 is formed in the middle of the male connector body 75. A jutting tube 79 containing a female screw 78 is placed within the box-like projection 77.

The female connector 72 has a connector body 80 with the convex portion 73. A number of terminal holes 81 corresponding to the terminal holes 76 of the male connector body 75 are formed in the female connector body 80. Female connector terminals (not shown) are each united to the terminal holes 81. The female connector terminals are each connected to the harnesses 35c of the harness bundle 35C.

A rectangular groove 82 into which the box-like projection 77 is inserted in formed in the middle of the female connector body 80. A hole 83 into which the tube 78 is inserted and through which a screw (not shown) penetrates is formed in the middle of the groove 82. The multiple connector 60 has a similar structure to that of the multiple connector 70.

To connect the male connector 71 to the female connector 72, the convex portion 73 of the female connector 72 is, as shown in FIG. 7, inserted into the concave portion 74 of the male connector 71, and then the projection 77 and the tube 79 of the male connector 71 are inserted into the groove 82 and the hole 83 of the female connector 72, respectively. After that, a screw (not shown) is inserted into the hole 83 from the direction of P to be engaged with the female screw 78 of the tube 79. The screw (not shown) is tightened up so that the convex portion 73 of the female connector 72 is fitted in the concave portion 74 of the male connector 71. When the convex portion 73 is completely fitted in the concave portion 74, the connection between the male and female connector terminals are completed.

The number of the male and female connector terminals of the multiple connector 70 can be reduced because terminals for the harness bundle 25A are not required. Accordingly, the multiple connector 70 is made small-sized and at a less cost. Further, since the number of the connector terminals is reduced, less force suffices to bind the male and female connectors 71 and 72 together with a screw, and thus the connection between them is easily performed. Further, since the harness bundle 25A is directly connected to the female connector 31a of the time control unit 31 without passing through the multiple connector 70, there is no need of increasing the number of connectors.

Further, because of the direct connection of the harness bundle 25A to the female connector 31a of the time control unit 31, a harness is not required between the female connector 31a of the time control unit 31 and the multiple connector 70. Accordingly, the number of harnesses is reduced, and thus less harnesses sufficiently serve the purpose.

In the above embodiment, a description was given of a case where the harnesses 25a of the harness bundle 25A are each connected to the female connector 31a of the time control unit 31. However, the present invention is also applicable to other control units, of course.

What is claimed is:

1. An arrangement of harnesses in a vehicle, wherein the vehicle is divided into at least two sections defined as first and second sections, a plurality of electronic parts disposed in the first section connected to a plurality of electronic parts disposed in the second section via a multiple connector, the plurality of electronic parts disposed in the second section including at least one control unit, said multiple connector having a construction in which a plurality of male connector terminals disposed in a male connector body are connected to a plurality of female connector terminals disposed in a female connector body such that the female connector body is fitted in a concave portion of the male connector body by a screw;

wherein a harness bundle consisting of a plurality of harnesses which connect to the plurality of electronic parts disposed in the first section is divided into at least two harness bundles defined as first and second harness bundles, said first harness bundle connected to said at least one control unit, said second harness bundle not connected to said at least one control unit;

said first harness bundle connecting directly to a unit connector connected to said at least one control unit; and said second harness bundle connecting to said plurality of electronic parts disposed in the second section via said multiple connector so as to make said multiple connector small-sized.

2. An arrangement of harnesses in a vehicle according to claim 1, wherein said control unit has a plurality of terminals disposed on a circuit substrate, said unit connector connecting to said terminals.

3. An arrangement of harnesses in a vehicle according to claim 1, wherein said control unit has first terminals disposed on an edge of a circuit substrate and a second terminals disposed on another edge of the circuit substrate, a terminal connector connected to said second terminals, said unit connector connected to said first terminals, and a plurality of harnesses connecting to electronic parts disposed in the second section connected to said terminal connector.

4. An arrangement of harnesses in a vehicle according to claim 1, wherein said control unit is included in a junction box attached to a steering member.

5. An arrangement of harnesses in a vehicle according to claim 1, wherein a hole through which a screw penetrates is formed in a middle of said female and male connector bodies of said multiple connector, said female connector body being fitted in the concave portion of said male connector body by the screw through said hole.

6. An arrangement of harnesses in a vehicle according to claim 5, wherein said male connector terminals are disposed in the vicinity of said hole of said male connector body, and said female connector terminals are disposed in the vicinity of said hole of said female connector body.

* * * * *